Nov. 12, 1935.    L. D. LOVEKIN    2,020,558
FIRE VALVE DEVICE FOR GAS METERS
Filed Feb. 12, 1932    3 Sheets-Sheet 3
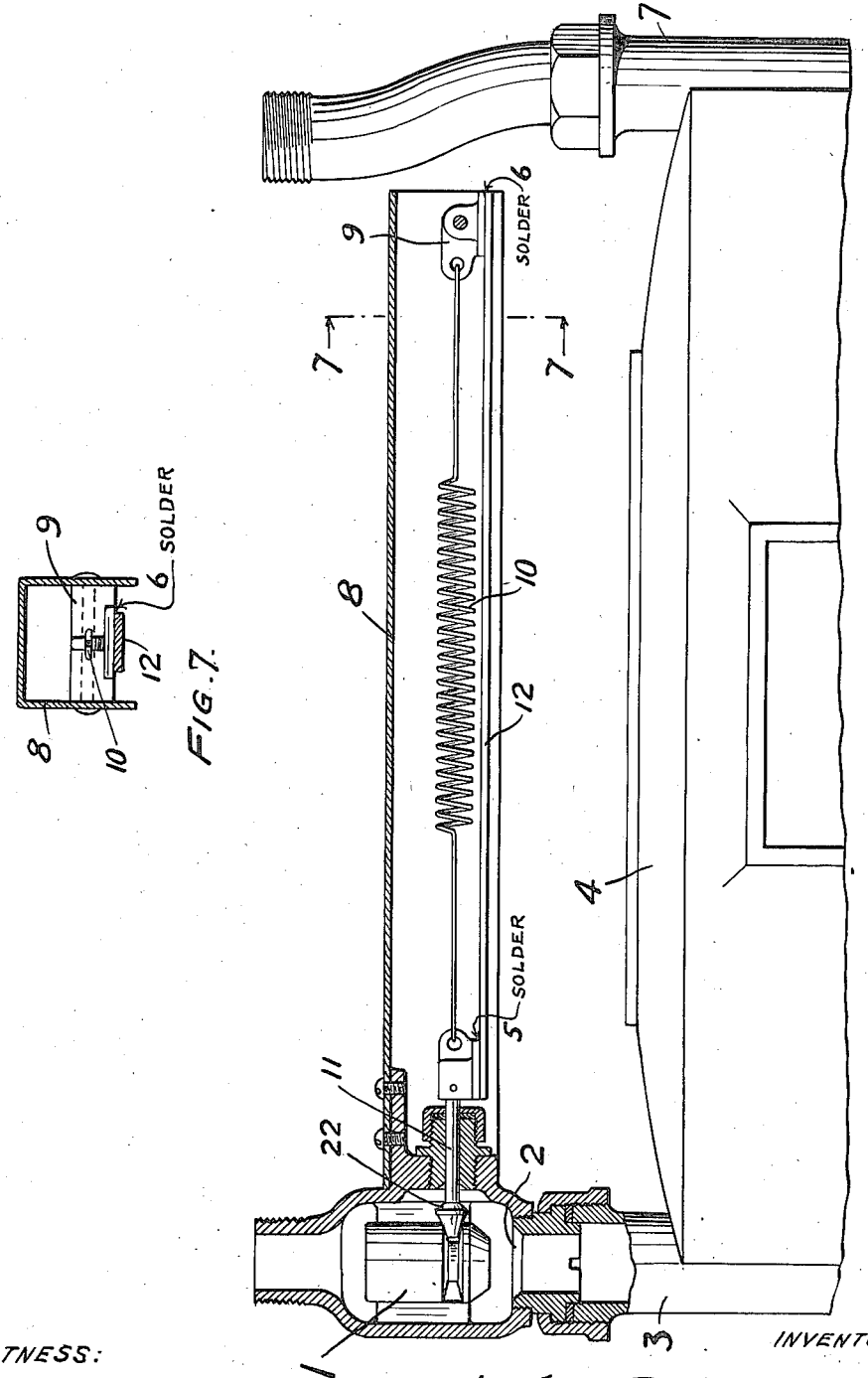
INVENTOR
Luther D. Lovekin
BY
Augustus B. Stoughton,
ATTORNEY.
WITNESS:

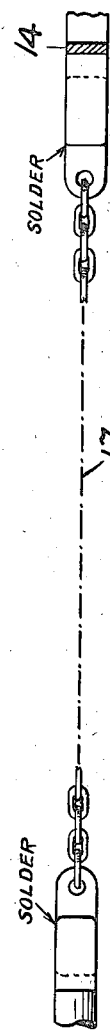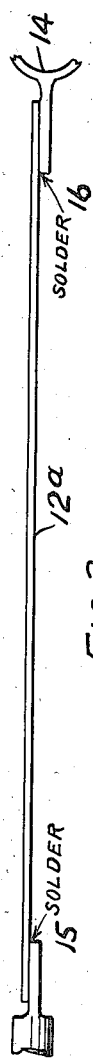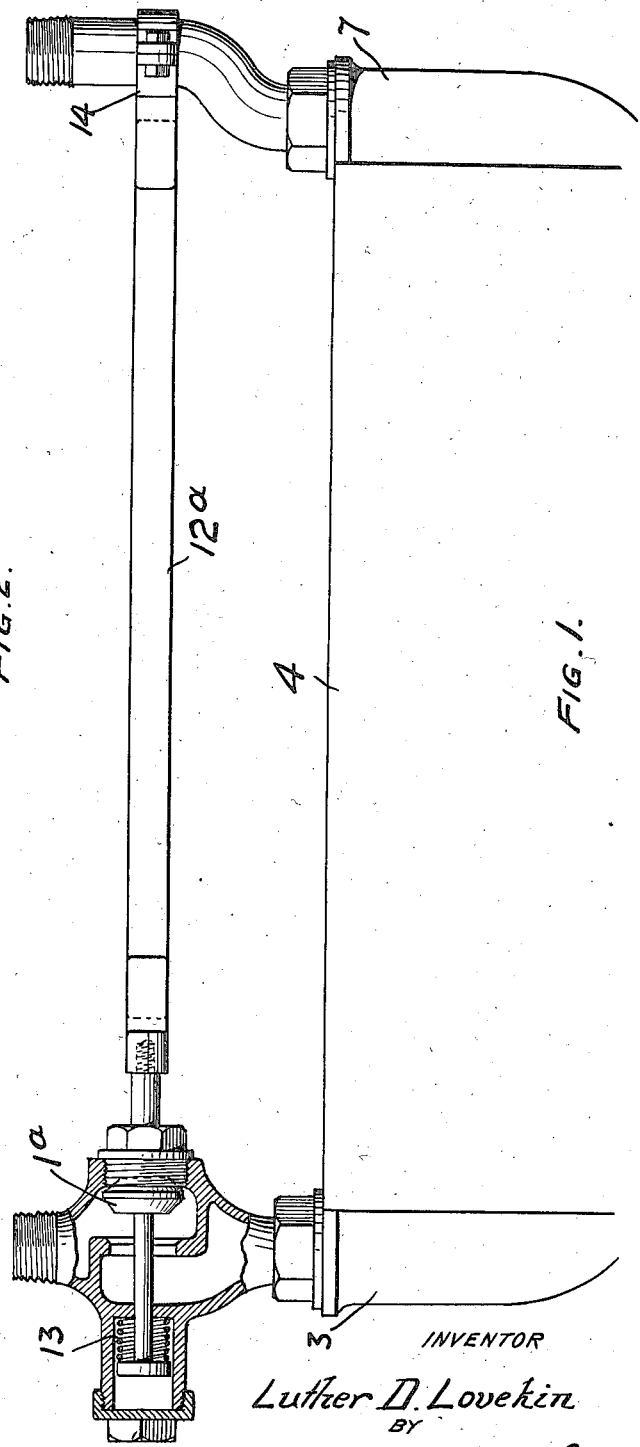

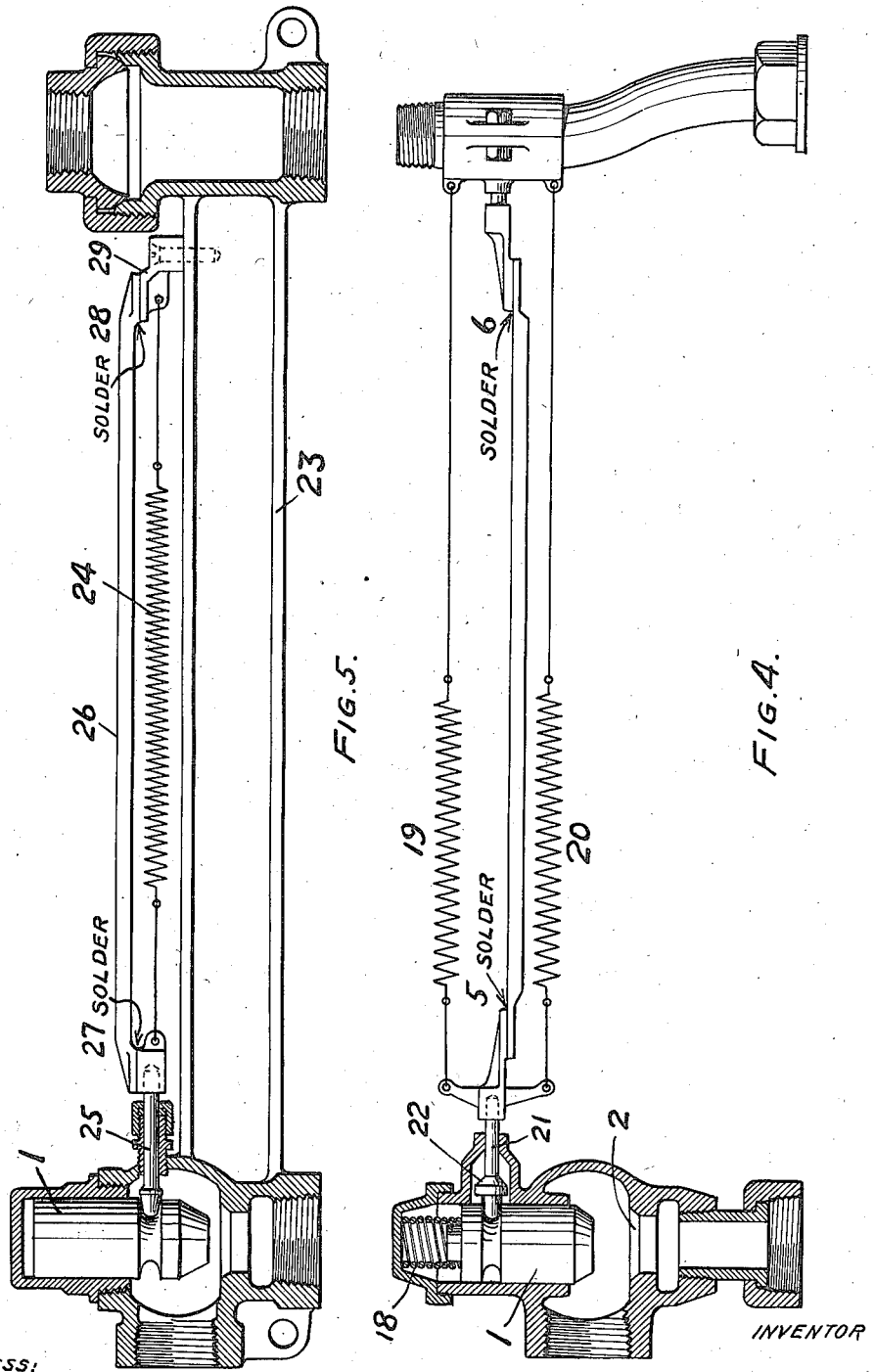

Patented Nov. 12, 1935

2,020,558

UNITED STATES PATENT OFFICE 2,020,558

FIRE VALVE DEVICE FOR GAS METERS

Luther D. Lovekin, Villa Nova, Pa., assignor to Kitson Company, Philadelphia, Pa., a corporation of West Virginia Application February 12, 1932, Serial No. 592,486

4 Claims. (Cl. 137—162)

It is an object of the present invention to provide for automatically shutting off the supply of gas to a gas meter in the event of fire in the neighborhood of either the inlet side or the outlet side of the meter or of some intermediate point. Another object of the invention is to provide simple, reliable, efficient and comparatively inexpensive valve mechanism adapted to accomplish the result stated.

Other objects will appear from the following description at the end of which the invention will be claimed.

Generally stated, the invention may be said to comprise a fire valve device for gas meters which comprises a gas shut off valve stressed to closing position and adapted for connection to the inlet of the meter, and means thermally responsive at and near both the inlet and the outlet portions of the meter and adapted to normally hold the valve in open position and to soften under rise in temperature anywhere in the neighborhood of the meter to release the valve.

The invention also comprises the improvements to be presently described and finally claimed.

In the following description reference will be made to the accompanying drawings forming part hereof and in which Figure 1 is an elevational view, partly in section, showing a gas meter fire valve device embodying features of the invention.

Fig. 2 is a top or plan view of the portion of the device shown in Fig. 1.

Fig. 3 is an elevational view illustrating a modification.

Fig. 4 is a view similar to Fig. 1 illustrating a modification.

Fig. 5 is a view similar to Fig. 4 illustrating another modification in which is embodied a meter bar.

Fig. 6 is a similar view illustrating another modification, and

Fig. 7 is a sectional view taken on the line 7—7 of Fig. 6.

Referring to the drawings and more particularly to Fig. 6, 1 is a gas shut-off valve stressed by its weight or by gravity to position for shutting off the supply of gas at the seat 2. The valve is adapted for connection to the inlet 3 of a gas meter indicated at 4. 5 and 6 indicate means thermally responsive at both the inlet 3 and the outlet 7 of the meter. These means comprise low temperature melting solder joints and they are adapted to hold the valve 1 in open position and to soften under rise in temperature at either side of the meter or at a point intermediate thereof and to release the valve 1 so that it closes. A fire in the neighborhood of either side of the meter causes such rise in temperature as has been referred to and operates to shut off the gas which is of course a matter of safety. There is a bracket 8 shown as of U-shape in cross section, and it is supported at the fitting of the inlet valve 1 and it extends substantially across the meter between the inlet and outlet connections. 9 is a terminal fitting or block secured at the end of the bracket. The spring 10 which is normally in tension has one end secured to the block 9 and the other end secured to the projecting portion of a catch 11, which is endwise movable through the casing of the valve and operates to normally engage a shoulder on the valve to hold it open. However, the spring 10 tends to move the catch to release the valve. 12 is a bar which normally resists the force of the spring and it is connected to the catch 11 and to the block 9 by the low temperature melting solder joints 5 and 6.

The construction and mode of operation of the device shown in Figs. 1 and 2 are as above described except that the valve 1a is stressed to its seat by a spring 13, and the bar 12a is secured to the spindle of the valve 1a and to the terminal fitting 14 by low temperature melting solder joints 15 and 16.

In the modification shown in Fig. 3, the bar is replaced by a chain 17, the ends of which are held by low temperature melting solder joints. It may be remarked that, if desired, the entire bar or chain may be made of low temperature melting solder, but joints of that material disposed in the neighborhood of the ends of the meter have advantages.

The construction and mode of operation are in Fig. 4 as have been described except that the valve 14 is constructed much as it is in Fig. 6 but is stressed by a spring 18, and springs 19 and 20 are employed for shifting the catch 21 which is shown as is also the catch in Fig. 6 as provided with an auxiliary valve 22 effective when the main valve is closed and also serving as a stop for the catch.

The construction and mode of operation in Fig. 5 are substantially as above described except that a meter bar 23 is shown as interposed between the inlet and the outlet fittings for the meter. One end of the spring 24 is attached to the meter bar 23, and the other end is attached to the catch 25. The bar 26 is secured by a low temperature melting solder joint 27 to the catch and also by a similar joint 28 to the fitting 29 that is secured to the bar 23.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A gas meter fire valve device comprising, in combination, a shut-off valve fitting having a bracket adapted to extend across the meter, a valve stressed to closed position, a catch for holding the valve in open position, a spring interposed between the end of the bracket and the catch, a sectional rod interposed between the catch and the end of the bracket, and spaced low temperature melting solder joints for splicing the sections of the rod.

2. A gas meter fire valve device comprising, in combination, a shut off valve fitting having a bracket of U form in cross section and adapted to extend across the meter, a terminal block in said bracket, a valve stressed to closed position, a catch for holding the valve in open position, a spring interposed between the block and catch, a sectional rod interposed between the block and catch, and spaced low temperature melting solder joints for splicing the sections of the rod.

3. A gas meter fire valve device comprising, in combination, a meter bar having at one end a meter outlet fitting and at the other end a meter inlet shutoff valve stressed to closed position, a sectional rod carried by said bar and adapted to hold said valve in open position, and spaced low temperature melting solder joints for splicing the sections of the bar.

4. A valve device for shutting off a gas meter in case of fire, comprising in combination, inlet and outlet connections for a gas meter, a valve in said inlet connection stressed to closed position, a catch retaining said valve in open position, a spliced metal bar connected between said inlet and outlet connections and forming a reinforcement therefor, soldered joints having a low melting point splicing said bar, and a spring in alignment with said bar for exerting an axial pull on said bar and on said catch upon the melting of one of said joints.

LUTHER D. LOVEKIN.